May 8, 1928.
R. S. CUNNINGHAM
VAPOR CONSERVATION SYSTEM
Filed Nov. 22 1926
1,669,230
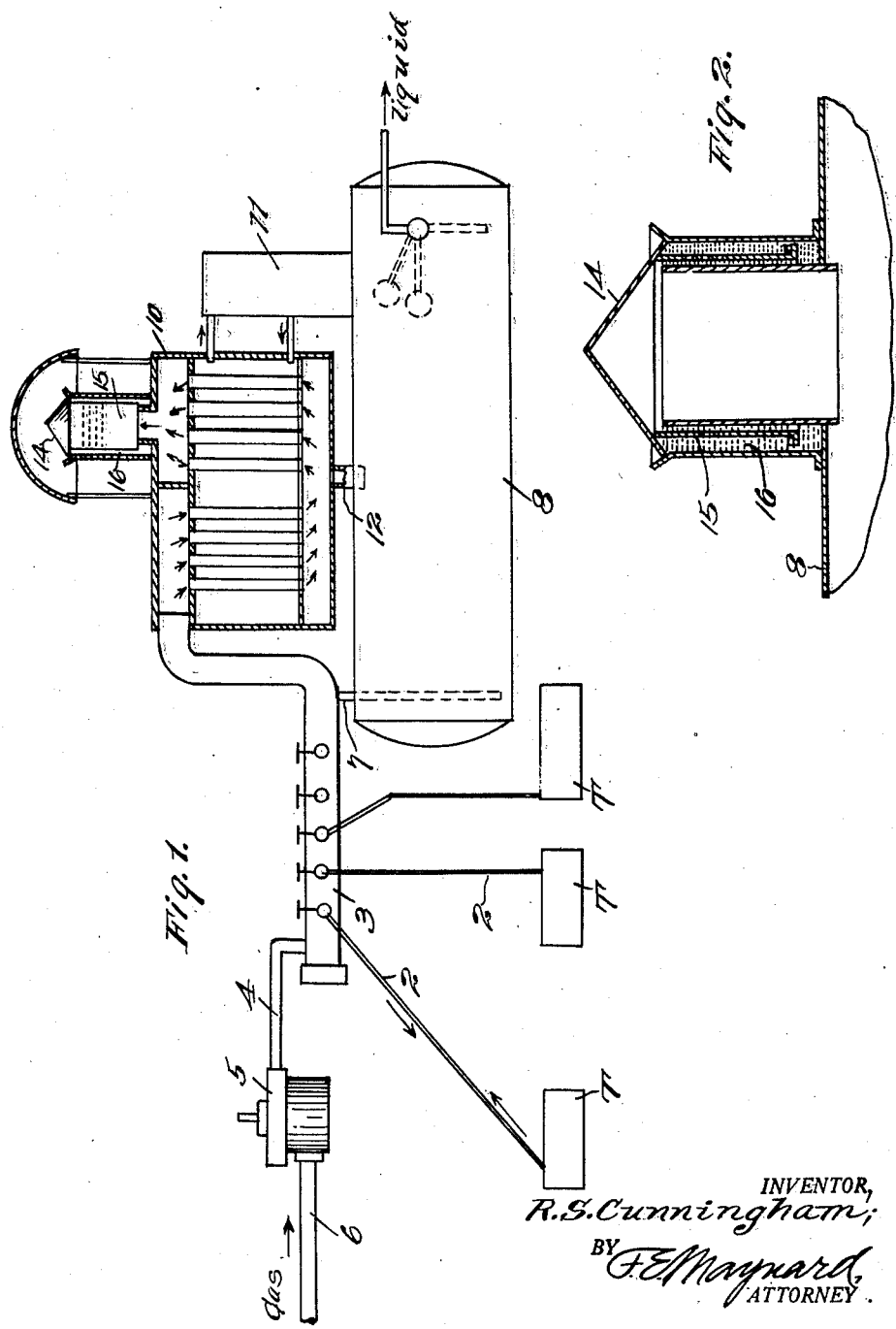

Patented May 8, 1928.

1,669,230

UNITED STATES PATENT OFFICE.

ROY S. CUNNINGHAM, OF LOS ANGELES, CALIFORNIA.

VAPOR-CONSERVATION SYSTEM.

Application filed November 22, 1926. Serial No. 150,034.

This invention relates to a safety method for reducing fire hazard in closed oil tanks in and about oil fields, refineries and storage farms.

Crude oils and their products are stored in large covered tanks and because of expansion and contraction of the fumes the tanks "breathe". This results in an intake of fresh air which, being admixed with the natural fumes from the oil, renders the gas in the tank combustible.

The broad object of my present invention is to provide for inhalation of non-combustible gas and the exclusion of fresh air as the tank inhales.

Another object is to effect an exhalation of the natural oil fumes and to condense as much thereof as may be expedient.

Further objects and advantages, and features of the invention will be made apparent in the following specification of an embodiment of the invention, and a form of apparatus whereby the same may be practiced; it being understood that modifications, variations and adaptations may be resorted to within the spirit, scope and principle of the invention as it is here claimed.

Figure 1 is a schematic view of the system.

Figure 2 is a detail of the safety vent.

By my method a supply of non-combustible gas is supplied as by a pipe 2 to the top of a tank T; the gas being from an oil well or other supply and inhalation of the gas taking place as the tank contents contracts. Upon expansion, due to heating, the gas on top of the liquid is exhaled through pipe 2 and is subjected to condensation in a condenser to throw down as much liquid content as practical.

Pipes 2 from a battery or farm of tanks T lead to a common manifold 3 to which connects a gas pipe 4 having a pressure regulator 5 to cut down supply gas line 6.

The manifold has a condensate drain 7 to a drum 8 to which is attached a condenser 10 of any desired type supplied with a cooling medium from a refrigerator 11. The manifold 3 leads to the top of the condenser and this has a drain 12 to the drum 8.

Pressure in the tanks T and in the manifold 3 is kept just slightly above the atmospheric.

In operation, when the tank contents expands the gas above the oil is exhaled to pipe 2, to manifold 3, and to condenser 10 where the exhaled gases are chilled. When exhalation occurs back pressure on the regulator cuts off inflow from the gas line 6, and if pressure is sufficient in the condenser 10 a safety valve 14, having a perforated skirt 15 in a well 16, is lifted to allow blow-off of the excess pressure.

When inhalation occurs in a tank T the valve 14 is closed, or closes, and gas from line 6 flows in past the regulator 5 to the manifold 3 and then to the inhaling tank; air being excluded by the valve 14.

Tanks may breathe from one to the other without air inflow at the valve 14.

All air being excluded, it will be seen that the gas in the tank is non-combustible.

It will be seen that in my method fresh gas is inhaled in one direction only from the gas governor 5 and passes to the system during a fall of pressure under the vent valve 14 which exhales the gases at a given pressure. This valve has outlet holes in the skirt 15. The gas and fumes from the tanks does not surge back and forth but has a forward movement in one direction only from the inhaling governor 5, intermittently according to tank conditions.

What is claimed is:

An oil tank storage system having, in combination, oil receivers, a manifold having gas lines running to said receivers for inflow and outflow of gaseous fluid, a master pressure reducing gas governor connected to the manifold for fresh inhalation supply to the receivers and means to supply gas for inhalation to the governor, and automatic valve means mechanically and operatively independent of the reducing governor for venting excess gas from the receivers to the atmosphere; whereby fresh inhalations of gas pass in one direction only to the manifold and excess is vented off, said governor acting to prevent reduction of pressure below atmospheric in the receivers supplied from the manifold.

R. S. CUNNINGHAM.